(12) United States Patent
Yamaguchi et al.

(10) Patent No.: US 12,025,422 B2
(45) Date of Patent: Jul. 2, 2024

(54) POSITION MEASUREMENT SYSTEM AND POSITION MEASUREMENT METHOD

(71) Applicant: MITSUBISHI HEAVY INDUSTRIES, LTD., Tokyo (JP)

(72) Inventors: Junpei Yamaguchi, Tokyo (JP); Masanobu Tsutsui, Tokyo (JP); Haruki Mori, Shiga (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 503 days.

(21) Appl. No.: 17/282,009

(22) PCT Filed: Oct. 11, 2019

(86) PCT No.: PCT/JP2019/040312
§ 371 (c)(1),
(2) Date: Apr. 1, 2021

(87) PCT Pub. No.: WO2020/105311
PCT Pub. Date: May 28, 2020

(65) Prior Publication Data
US 2021/0333092 A1 Oct. 28, 2021

(30) Foreign Application Priority Data
Nov. 21, 2018 (JP) ................. 2018-218425

(51) Int. Cl.
*G01B 11/00* (2006.01)
*B25J 13/02* (2006.01)
*B25J 13/08* (2006.01)

(52) U.S. Cl.
CPC ............ *G01B 11/005* (2013.01); *B25J 13/02* (2013.01); *B25J 13/089* (2013.01); *G05B 2219/40601* (2013.01)

(58) Field of Classification Search
CPC ...... G01B 11/005; G01B 11/002; G01B 11/14; G01B 11/16; G01B 11/24; G01B 11/245;
(Continued)

(56) References Cited

U.S. PATENT DOCUMENTS

| 2015/0314891 A1 | 11/2015 | Cobb et al. |
| 2016/0169213 A1 | 6/2016 | Calkins et al. |

(Continued)

FOREIGN PATENT DOCUMENTS

| JP | 2015167986 A | 9/2015 |
| JP | 2015221489 A | 12/2015 |

(Continued)

OTHER PUBLICATIONS

International Search Report and Written Opinion of International Application No. PCT/JP2019/040312 dated Dec. 10, 2019; 15pp.

*Primary Examiner* — Christina A Riddle
(74) *Attorney, Agent, or Firm* — HAUPTMAN HAM, LLP (57) ABSTRACT

An object is to, in a case where it is necessary to share a common coordinate system by a plurality of position measurers, reduce an error in the coordinate system between the position measurers. A position measurement system allows a plurality of laser trackers to share position measurement of a plurality of measurement points. The laser tracker measures three coordinate definition targets for defining a coordinate system of the measurement points, defines a work coordinate system from measurement results of the three coordinate definition targets, and measure the measurement points allocated to the laser tracker using the defined work coordinate system. The other laser trackers and measure the measurement points allocated to the other laser trackers and using correction vectors based on a positional relationship between the laser tracker and the laser trackers and obtained (Continued)

in advance, and the work coordinate system defined by the one laser tracker.

8 Claims, 5 Drawing Sheets

(58) Field of Classification Search
CPC .............. B25J 13/02; B25J 13/00–089; G05B 2219/40601; G01C 3/00; G01C 3/06; G01C 15/00; G01C 3/02; G01C 3/08; G01C 3/085; G01C 3/10; G01C 3/14; G01C 3/16; G01C 3/18; G01C 3/22; G01C 3/24; G01C 3/26; G01C 3/28; G01C 15/002; G01C 15/004; G01C 15/006; G01C 15/02; G01C 15/105
USPC .......................................... 356/3–22, 614–624
See application file for complete search history.

(56) References Cited

U.S. PATENT DOCUMENTS

| | | |
|---|---|---|
| 2016/0265903 A1* | 9/2016 | Zhu .......................... G01S 17/87 |
| 2017/0066046 A1 | 3/2017 | Sugiura et al. |
| 2017/0254637 A1* | 9/2017 | Nakano ..................... G01C 3/08 |
| 2018/0094537 A1* | 4/2018 | Pulisciano ............. H04N 13/20 |
| 2018/0147729 A1 | 5/2018 | Tombe et al. |
| 2020/0171665 A1 | 6/2020 | Kono et al. |

FOREIGN PATENT DOCUMENTS

| | | |
|---|---|---|
| JP | 2016121681 A | 7/2016 |
| JP | 2017042881 A | 3/2017 |
| JP | 2017226023 A | 12/2017 |
| JP | 2018109552 A | 7/2018 |
| WO | 2014033823 A1 | 3/2014 |
| WO | 2018185893 A1 | 10/2018 |

* cited by examiner

POSITION MEASUREMENT SYSTEM AND POSITION MEASUREMENT METHOD

RELATED APPLICATIONS

The present application is a National Phase of International Application Number PCT/JP2019/040312 filed Oct. 11, 2019 and claims priority of Japanese Application Number 2018-218425 filed Nov. 21, 2018.

TECHNICAL FIELD

The present invention relates to a position measurement system and a position measurement method.

BACKGROUND ART

When manufacturing a structure of an aircraft component such as the fuselage or and wing of an aircraft, there are cases where other components such as clips may be attached to a longitudinal member such as a stringer included in the structure.

For example, PTL 1 discloses an assembling apparatus for assembling a clip to a stringer. In PTL 1, the assembling apparatus in which a plurality of supporting robots for gripping the stringer are arranged in a row on a conveyor, and an operation of attaching the clip to the stringer is performed by moving the plurality of supporting robots in a state of gripping the stringer to the location of an attaching robot where the clip is attached by the conveyor is disclosed.

PTL 1 discloses that the position of a reflector provided on each robot is detected by one laser tracker, and the operation of each robot is controlled based on the detected position.

However, as disclosed in PTL 1, in a case where it is necessary to measure the position coordinates of a plurality of measurement points, a plurality of laser trackers are installed from the viewpoint of efficiency, and the measurement of the position coordinates of the plurality of supporting robots is shared by the plurality of laser trackers.

In this case, the plurality of laser trackers need to share a common coordinate system. In the related art, in order to acquire a common coordinate system by each laser tracker, for example, each laser tracker detects three reflectors for defining a coordinate system, which are provided on an abutting plate installed on a conveyor in the same manner as a supporting robot or the like, and each laser tracker defines the coordinate system from the detected coordinate positions of the three points.

CITATION LIST

Patent Literature

[PTL 1] Japanese Unexamined Patent Application Publication No. 2017-42881

SUMMARY OF INVENTION

Technical Problem

However, in the method of defining the coordinate system as described above, there is concern that the accuracy of position measurement by each laser tracker may decrease.

That is, since it is necessary to prevent the mutual positions of the three reflectors for defining the coordinate system from changing significantly due to thermal factors or the like, there is a restriction that the mutual distance therebetween cannot be increased so much. Even in the laser tracker, the coordinate system defined from the positions of the three reflectors includes a considerable amount of error.

On the other hand, the mutual distance between the laser trackers and the mutual distance between the supporting robots are longer than the mutual distance between the reflectors for defining the coordinate system. Therefore, in a case where an error (particularly an angle error) is included in the coordinate systems respectively defined by the laser trackers, the error included in the coordinate systems increases and appears in the measurement position of each supporting robot measured based on the coordinate systems, so that there is a problem that it is difficult to improve the measurement accuracy.

The above-mentioned problem is not a problem specific to the system that handles the stringer disclosed in PTL 1, but a problem that commonly appears in a system that needs to share a common coordinate system among a plurality of position measurers.

The present invention has been made in view of such circumstances, and an object thereof is to provide a position measurement system and a position measurement method capable of, in a case where it is necessary to share a common coordinate system by a plurality of position measurers, reducing an error in the coordinate system between the position measurers.

Solution to Problem

A first aspect of the present invention provides a position measurement system including: one position measurer that measures some of a plurality of measurement points; and another position measurer that measures the remaining measurement points, in which the one position measurer measures three coordinate definition targets for defining a coordinate system of the measurement points, defines the coordinate system from measurement results of the three coordinate definition targets, and measures the measurement points allocated to the one position measurer using the defined coordinate system, and the other position measurer measures the measurement points allocated to the other position measurer using a correction vector based on a positional relationship between the one position measurer and the other position measurer obtained in advance, and the coordinate system defined by the one position measurer.

According to the position measurement system, the position measurement of the plurality of measurement points is shared by the one position measurer and the other position measurer. In this case, a plurality of position measurers may be provided as the other position measurer.

The one position measurer measures the three coordinate definition targets for defining the coordinate system of the measurement points, and defines the coordinate system of the measurement points from the measurement results. Then, the defined coordinate system is shared with the other position measurer. The other position measurer creates the coordinate system of the measurement points in the other position measurer using the coordinate system of the measurement points defined by the one position measurer and the correction vector based on the positional relationship with the one position measurer obtained in advance. The other position measurer also measures the measurement points using the created coordinate system.

As described above, since the information of the coordinate system defined by the one position measurer is shared with the other position measurer and the one position measurer and the other position measurer measure the measurement points based on the coordinate system, it is possible to reduce an error in the coordinate system used by each of the position measurers and improve the accuracy of position measurement of the measurement points compared to a case where each of the position measurers individually defines the coordinate system.

In the position measurement system, it is preferable that three fixed targets installed at a distance from each other are measured by the one position measurer and the other position measurer, the correction vector used by the other position measurer is calculated based on measurement results of the three fixed targets, and target mutual distances between the three fixed targets are set to be longer than target mutual distances between the coordinate definition targets used for defining the coordinate system of the measurement points.

As described above, by measuring the positions of the three fixed targets by each of the one position measurer and the other position measurer, it is possible to obtain the position information of each of the position measurers in the coordinate system based on common fixed targets. In addition, based on the position information obtained by each of the position measurers, a difference vector from the one position measurer to the other position measurer is obtained as the correction vector. At this time, since the target mutual distances between the three fixed targets are set to be longer than target mutual distances between the coordinate definition targets used for defining the coordinate system of the measurement points, it is possible to reduce an error (particularly, rotation angle) between the measurement periods of the coordinate system of the position measurers defined by the measurement results of the three fixed targets by each of the position measurers.

In the position measurement system, a coordinate origin may be set using the fixed target of the three fixed targets which is at a position closest to all of the position measurers, a coordinate system of the position measurers may be defined by defining rotation in two orthogonal directions using the other two fixed targets, and the correction vector may be calculated using the coordinate system of the position measurers.

As described above, since the origin of the coordinate system of the position measurers is defined by using the fixed target at a position closest to each of the position measurers, an error in the origin in the coordinate system defined by each of the position measurers can be reduced. Accordingly, it is possible to improve the accuracy of the correction vector.

In the position measurement system, the coordinate system of the measurement points may move with respect to an installation position of the one position measurer.

According to the position measurement system, since the coordinate system information of the measurement points defined by the one position measurer is shared with the other position measurer, even in a case where the installation position of the one position measurer and the measurement points move relative to each other, the coordinate system of the measurement points used by each of the position measurers can be obtained only by measuring the coordinate definition targets with the one position measurer.

A second aspect of the present invention is a robot control device that controls a robot using measurement results of the measurement points measured by the position measurement system described above.

A third aspect of the present invention is a position measurement method of sharing measurement of a plurality of measurement points by a plurality of position measurers, the method including: a step of measuring three coordinate definition targets for defining a coordinate system of the measurement points by one of the position measurers; a step of defining the coordinate system from measurement results of the three coordinate definition targets; a step of, by the one position measurer, measuring the measurement points allocated to the one position measurer using the defined coordinate system; and a step of, by another position measurer, measuring the measurement points allocated to the other position measurer, using correction vectors based on a positional relationship between the one position measurer and the other position measurer obtained in advance and the coordinate system defined by the one position measurer.

Advantageous Effects of Invention

According to the present invention, in a case where it is necessary to share a common coordinate system by a plurality of position measurers, an effect of reducing an error in the coordinate system between the position measurers is exhibited.

DESCRIPTION OF EMBODIMENTS

Hereinafter, a position measurement system and a position measurement method according to an embodiment of the present invention will be described with reference to the drawings.

In the following description, a case where the position measurement system and the position measurement method according to the present invention are applied to the control of a robot used when assembling a structure of an aircraft component such as the fuselage and main wing of an aircraft will be described as an example, but the present invention is not limited to this example. The present invention can be widely applied in a case where a plurality of position measurers share a common coordinate system and measure the position coordinates of a plurality of measurement points.

First, the configuration of an assembling apparatus 1 according to the present embodiment will be described with reference to FIG. 1. The assembling apparatus 1 includes a transporting device 2, a table 3, a plurality of supporting robots 4, abutting plates 5, an attaching robot 6, a gripping robot 11, and the like.

The assembling apparatus 1 takes out a stringer 10 which is a longitudinal member from a supply position 20 and transports the stringer 10 to an attachment position 21. Then, clips 22 are attached to the stringer 10 at the attachment position 21. The stringer 10 before attaching the clips 22 is temporarily placed at the supply position 20, and the attaching robot 6 and the gripping robot 11 are fixedly placed on the floor in the vicinity of the attachment position 21.

The stringer 10 is, for example, a structural member of an aircraft, has a length of about 5 m to 15 m, and has, for example, a double curved shape and a three-dimensional shape. The clip 22 is a component for joining a longitudinal frame connected to a plurality of stringers 10. By attaching the clips 22 at accurate positions with respect to the longitudinal direction of the stringer 10, when assembling a single frame to the plurality of stringers 10, it is possible to connect the clips 22 across the plurality of stringers 10 without bending the frame.

As the transporting device 2, a commonly used device can be applied, and the table 3, which will be described later, is placed on the transporting device 2. The transporting device 2 moves the table 3 from one end side to the other end side and from the other end side to one end side. One end side of the transporting device 2 is in the vicinity of the supply position 20 of the stringer 10, and the transporting device 2 moves the table 3 from the vicinity of the supply position 20 to the vicinity of the attaching robot 6.

In a case where the attaching robot 6 attaches the clips 22 to a plurality of work points set at intervals along the longitudinal direction of the stringer 10, after the attachment of the clips 22 to the work points of the stringer 10 is completed, the transporting device 2 moves a predetermined amount. Accordingly, the stringer 10 is transported by a predetermined amount while the supporting robot 4 grips the stringer 10 in a state of maintaining the component shape in a predetermined holding shape, so that the next work point can be moved to the position of the attaching robot 6. Then, when the attachment of the clips 22 at the work point is completed, the transporting device 2 moves a predetermined amount, so that the next work point is moved to the position of the attaching robot 6. By repeating such an operation, the clips 22 are attached over the entire longitudinal direction of the stringer 10.

The plurality of supporting robots 4 and the abutting plates 5 are installed in a row on the table 3. Accordingly, the plurality of supporting robots 4 and the abutting plate move integrally on the transporting device 2. The plurality of supporting robots 4 are placed in a row on the table 3, and the abutting plates 5 are respectively placed on both ends of the table 3, that is, on both sides of the plurality of supporting robots 4. The number of supporting robots 4 placed on the table 3 and the distance between the supporting robots 4 are preset according to the stringer 10 to be assembled. The number of supporting robots 4 that operate to grip the stringer 10 is determined according to the length of the stringer 10 that is actually gripped. FIG. 1 shows a state in which four of the five supporting robots 4 grip the stringer 10.

The abutting plate 5 has, for example, a flat plate portion 16, and one end of the stringer 10 is abutted on the surface of the flat plate portion 16.

The abutting plate 5 has a configuration for restraining one end of the stringer 10. Accordingly, one end of the stringer 10 abutted against the abutting plate 5 can be used as a reference position for positioning when the other clip 22 is attached.

The abutting plates 5 are respectively placed at both ends of the table 3, that is, on both sides of the plurality of supporting robots 4. When the stringer 10 is brought into contact with the abutting plate 5, only one abutting plate 5 of the two abutting plates 5 is used. The abutting plate 5 is selected according to the reference position (direction) of the stringer 10.

The abutting plate 5 is an example of a positioning member for defining the reference position, and the configuration is not limited to this example. That is, the positioning member may have a function for defining the reference position, and may be, for example, a member on a flat plate provided with a pin-shaped protrusion at a point where positioning is performed. In this case, positioning of one end of the stringer is performed by inserting the pin-shaped protrusion into a hole provided in advance in the stringer or a component fixed to the stringer.

Figure 4:
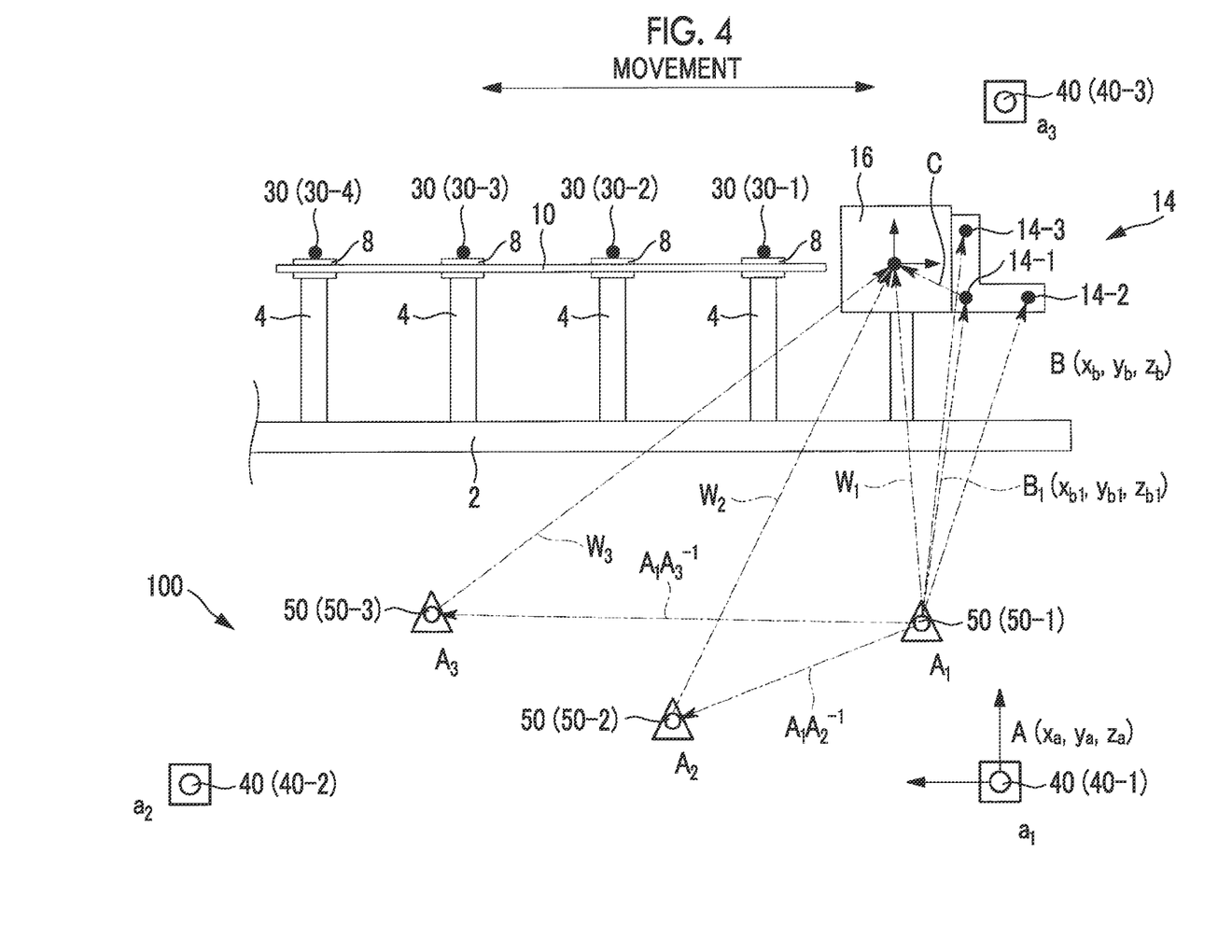
FIG. 4 is a schematic configuration diagram showing a configuration of a position measurement system according to the embodiment of the present invention.

As shown in FIG. 4, the flat plate portion 16 of the abutting plate 5 is provided with at least three reflectors 14-1, 14-2, and 14-3 that constitute coordinate system definition targets for defining the coordinate system of the assembling apparatus 1.

A laser tracker 50 irradiates the three reflectors 14-1, 14-2, and 14-3 constituting coordinate definition targets 14 with laser light, and receives the reflected light to measure the position of each of the reflectors 14-1, 14-2, and 14-3. Then, a work coordinate system, which is a reference coordinate system of the assembling apparatus 1, is specified from the position information of the three reflectors 14-1, 14-2, and 14-3. Based on the work coordinate system, the positions and postures of hand portions 8, 17, and 37 included in the supporting robot 4, the attaching robot 6, and the gripping robot 11, which will be described later, are detected. Details of a method for specifying the work coordinate system and the like will be described later.

Figure 1:
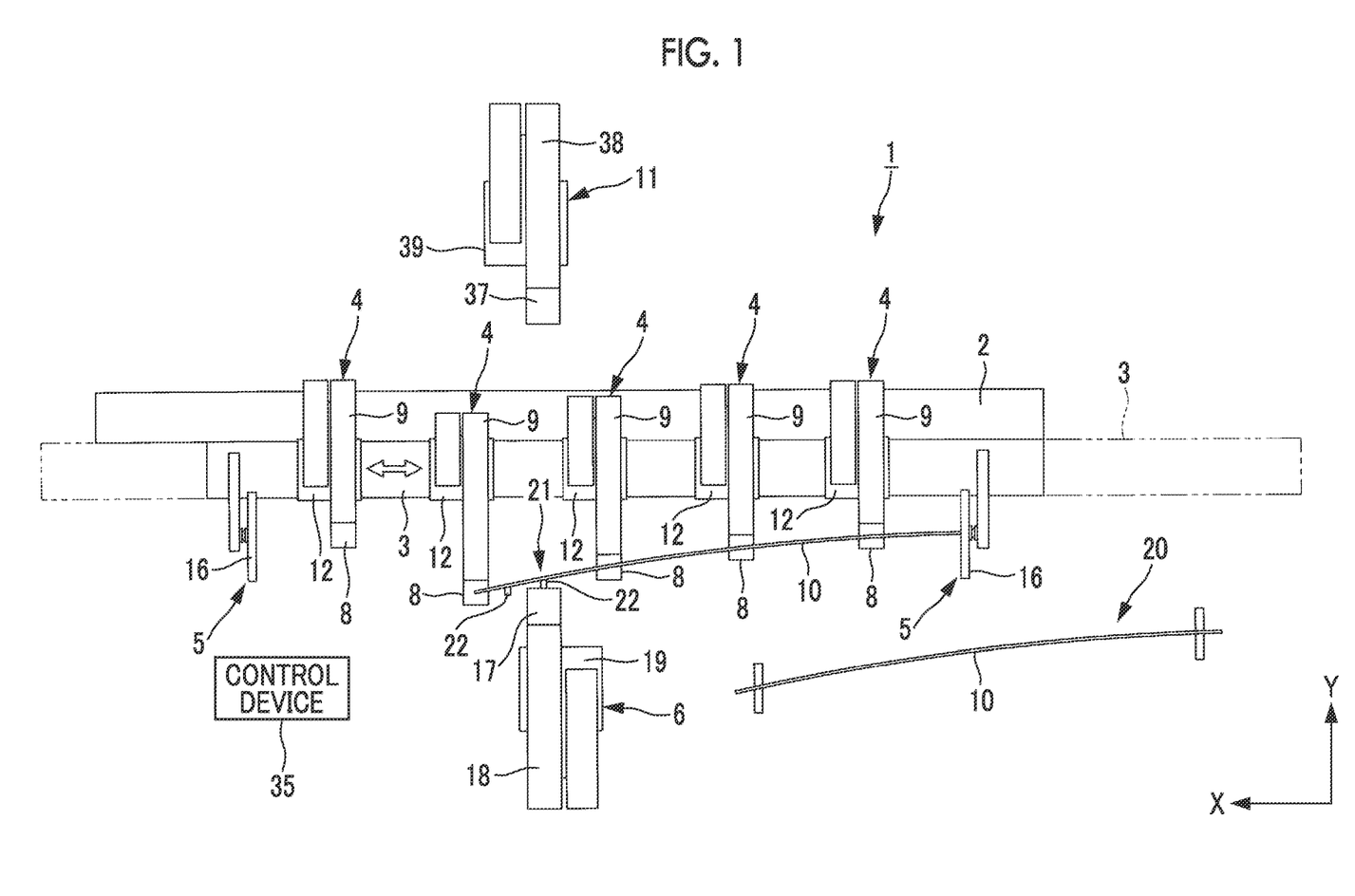
FIG. 1 is a plan view showing an assembling apparatus according to an embodiment of the present invention.
Figure 2:
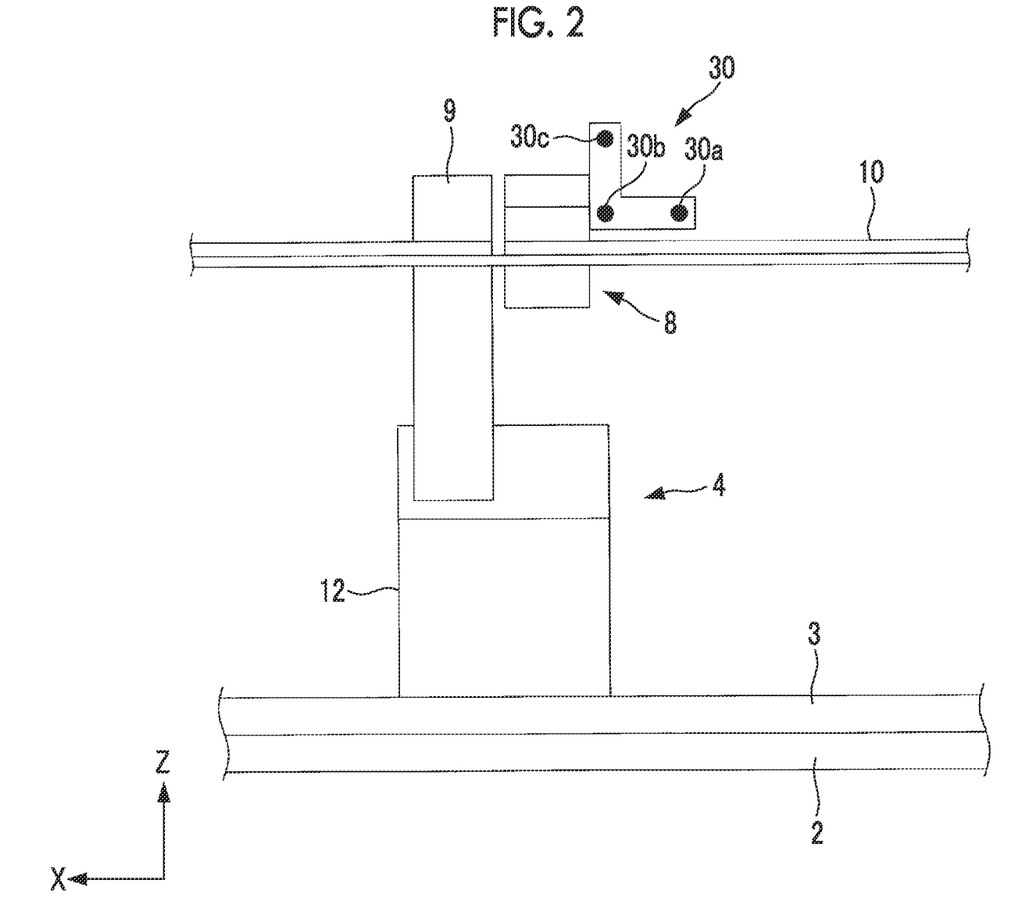
FIG. 2 is a schematic configuration diagram schematically showing a supporting robot according to the embodiment of the present invention.

As shown in FIGS. 1 and 2, the supporting robot 4 has the hand portion 8 having a configuration for gripping the stringer 10, an arm portion 9 having the hand portion 8 at the tip thereof, a body portion 12 that supports the arm portion 9, and the like. The arm portion 9 and the body portion 12 have a configuration in which the hand portion 8 is moved so that the hand portion 8 can appropriately support the stringer 10. A commonly used robot configuration can be applied to the arm portion 9 and the body portion 12.

The hand portion 8 is provided with a measurement point for measuring the position and posture of the hand portion 8. The measurement point 30 is constituted by, for example, three reflectors 30a, 30b, and 30c. The positions of these reflectors are detected by the laser tracker 50. By detecting the positions of the three reflectors in this manner, it is possible to detect not only the position of the hand portion 8 but also the posture thereof. The position information of the three reflectors measured by the laser tracker 50 is output to a supporting robot control unit 32 (FIG. 3), which will be described later, to be used for controlling the supporting robot 4.

As shown in FIG. 1, the attaching robot 6 has the hand portion 17 for attaching the clip 22 to a plurality of work points set at intervals in the longitudinal direction of the stringer 10, an arm portion 18 having the hand portion 17 at the tip thereof, a body portion 19 that supports the arm portion 18, and the like. As shown in FIG. 1, one attaching robot 6 may be provided, or a plurality of attaching robots 6 may be provided.

The attaching robot 6 may also have a function of clamping, drilling, and tacking the stringer 10 and the clip 22.

Similar to the hand portion 8 of the supporting robot 4 described above, the hand portion 17 of the attaching robot 6 is also provided with a measurement point (not shown) constituted by three reflectors for measuring the position and posture. By detecting these measurement points by the laser tracker 50, it is possible to detect not only the position of the hand portion 17 but also the posture thereof. The position and posture of the attaching robot 6 measured by the laser tracker 50 are output to an attaching robot control unit 33 (FIG. 3), which will be described later, to be used for controlling the attaching robot 6.

The gripping robot 11 has the hand portion 37 having a configuration for gripping the stringer 10 and the clip 22, an arm portion 38 having the hand portion 37 at the tip thereof, a body portion 39 that supports the arm portion 38, and the like. The hand portion 37 has a configuration capable of moving the stringer 10 in an X direction, and has a configuration capable of positioning the Y coordinate and the Z coordinate of the stringer 10.

After the gripping robot 11 properly supports the stringer 10, the attaching robot 6, the gripping robot 11, or another robot clamps, drills, or tacks the stringer 10 and the clip 22.

Similar to the hand portion 8 of the supporting robot 4 described above, the hand portion 37 of the gripping robot 11 is also provided with a measurement point (not shown) constituted by three reflectors for measuring the position and posture. By detecting these measurement points by the laser tracker 50, it is possible to detect not only the position of the hand portion 37 but also the posture thereof. The position and posture of the gripping robot 11 measured by the laser tracker 50 are output to a gripping robot control unit 34 (FIG. 3), which will be described later, to be used for controlling the gripping robot 11.

A method of defining the coordinate system and a method of detecting the position and posture of various robots such as the supporting robot 4 are not limited to the method using the above three reflectors, and for example, a 6DoF tracking device or the like may be used. The 6DoF tracking device has, for example, a laser tracker and a camera, and may irradiate a reflector provided at the center portion of a coordinate system definition target with laser light, receive the reflected light to measure the position of the reflector, photograph one or a plurality of LEDs attached to the surface of the target, and process the image, thereby defining a three-dimensional Cartesian coordinate system or detecting the position and posture of various robots.

Figure 3:
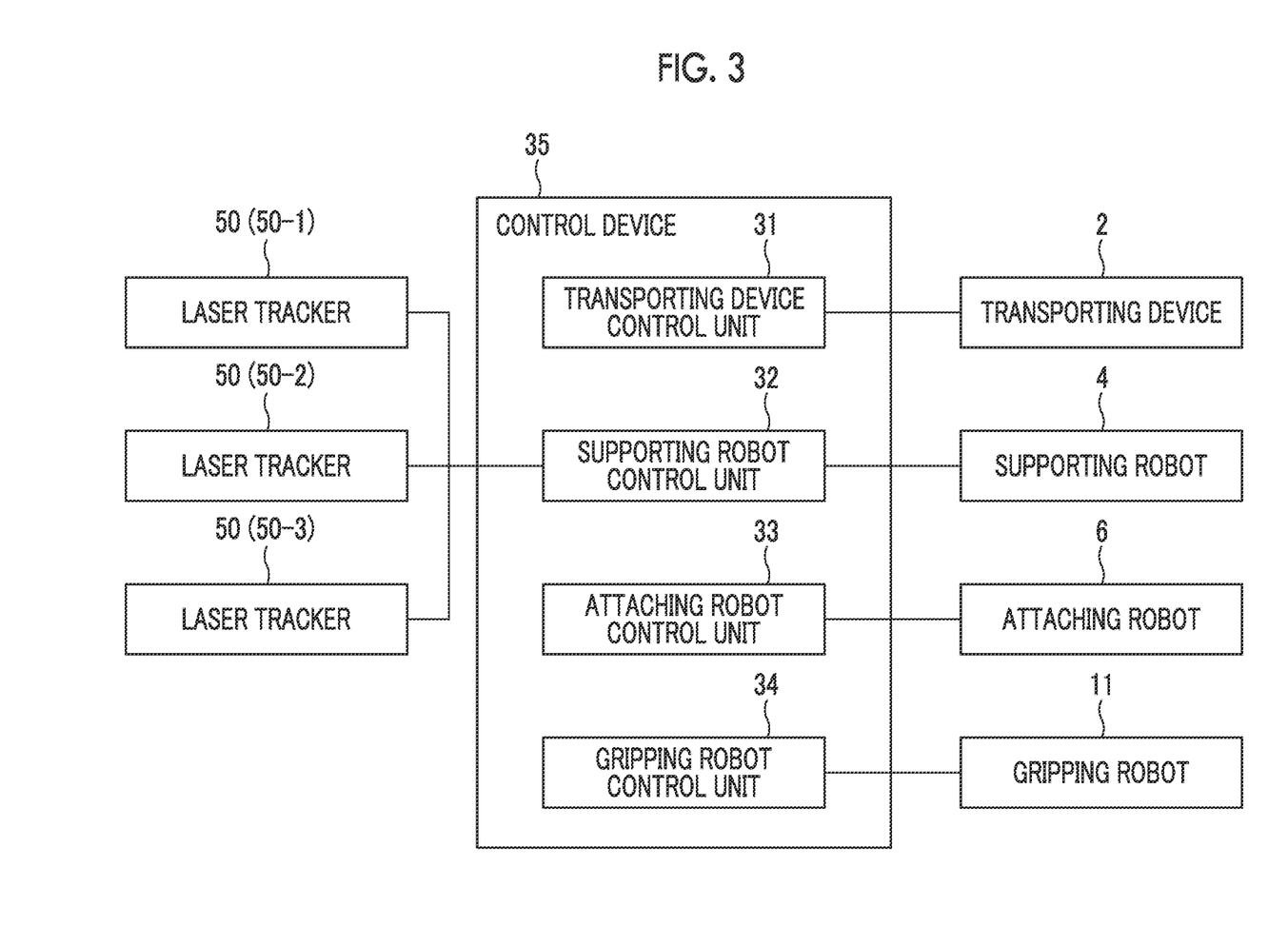
FIG. 3 is a functional block diagram of a control device that controls the assembling apparatus according to the embodiment of the present invention.

As shown in FIG. 3, a control device 35 that controls the assembling apparatus 1 includes, for example, a transporting device control unit 31, the supporting robot control unit 32, the attaching robot control unit 33, the gripping robot control unit 34, and the like.

The control device 35 includes, for example, a Central Processing Unit (CPU), a Random Access Memory (RAM), a Read Only Memory (ROM), a computer-readable storage medium, and the like. As an example, a series of processes for realizing various functions are stored in a storage medium or the like in the form of a program, and the CPU reads this program on the RAM or the like to execute information processing and computational processing, whereby various functions are realized. The program may apply a form in which the program is installed in the ROM or another storage medium in advance, a form in which the program is provided in a state of being stored in a computer-readable storage medium, a form in which the program is distributed via wired or wireless communication means, or the like. Examples of the computer-readable storage medium include magnetic disks, magneto-optical disks, CD-ROMs, DVD-ROMs, and semiconductor memories.

The transporting device control unit 31 adjusts the position of the transporting device 2 so that a predetermined region of the stringer 10 moves to the attachment position 21. The transporting device control unit 31 controls the movement of the transporting device 2 so that the plurality of work points provided at intervals in the longitudinal direction of the stringer 10 sequentially reach the attachment position of the attaching robot 6. For example, the transporting device control unit 31 may be included in the supporting robot control unit 32, which will be described later. That is, the supporting robot control unit 32, which will be described later, may control the movement of the transporting device 2.

The supporting robot control unit 32 moves the hand portion 8 based on the position information of the measurement point 30 of the hand portion 8 of the supporting robot 4 acquired by the laser tracker 50, which will be described later. The supporting robot control unit 32 brings the end portion of the stringer 10 into contact with the abutting plate 5. The supporting robot control unit 32 moves the hand portions 8 of the plurality of supporting robots 4 based on the original shape of the stringer 10.

Similar to the supporting robot control unit 32 and the like, the attaching robot control unit 33 moves the hand portion 17 based on the position information acquired by the laser tracker or the like (not shown). The attaching robot control unit 33 operates the hand portion 17 so as to attach another clip 22 to the stringer 10. The attaching robot control unit 33 causes the hand portion 17 to clamp, drill, or tack the stringer 10 and the clip 22. However, this function may be performed by the gripping robot control unit 34, which will be described later, or a control unit for another robot.

The gripping robot control unit 34 also performs various controls such as movement of the hand portion 37 based on the position information acquired by the laser tracker or the like (not shown).

The laser tracker 50 may detect the positions and postures of various robots such as the supporting robot 4 in response to commands from the transporting device control unit 31, the supporting robot control unit 32, the attaching robot control unit 33, and the gripping robot control unit 34, and transmit the detected positions and postures to the corresponding control units 31 to 34. That is, the laser tracker 50 may also a control object of each of the control units 31 to 34.

Next, a position measurement system 100 according to the embodiment of the present invention will be described with reference to FIG. 4. The position measurement system 100 according to the present embodiment includes a plurality of the laser trackers (position measurers) 50. In the present embodiment, a case where three laser trackers 50-1, 50-2, and 50-3 are provided is illustrated, but two or more laser trackers may be provided. In the following description, the laser trackers 50-1, 50-2, and 50-3 are referred to as the laser trackers 50-1, 50-2, 50-3 in a case where distinguishment therebetween is necessary and are simply referred to as the laser tracker 50 in a case where distinguishment therebetween is not necessary. The same applies to other configurations.

The laser tracker 50 detects the coordinate position of the reflector by irradiating the reflector with laser light and receiving the reflected light from the reflector.

In the position measurement system 100 according to the present embodiment, for example, the plurality of laser trackers 50 share the measurement of a plurality of measurement points 30 provided in the hand portion 8 of each of the supporting robots 4.

Here, in a case where the position measurement of the plurality of measurement points 30 is shared by the plurality of laser trackers 50, the laser trackers 50 need to share a common coordinate system. Therefore, first, a step of defining a common coordinate system by each of the laser trackers 50 and sharing the common coordinate system is necessary.

Hereinafter, a method of defining the shared coordinate system will be described in detail with reference to FIG. 4.

First, each of the laser tracker 50-1, 50-2, and 50-3 measures the positions of three fixed targets 40-1, 40-2, and 40-3. Here, the three fixed targets 40 are installed at a distance from each other. Here, the mutual distance between the fixed target 40 is set to be longer than the mutual distance between the coordinate definition targets 14 described later, and each fixed target 40 is provided at a position measurable by all of the laser trackers 50.

It is preferable that the mutual distance between the fixed targets 40 is set to be longer than, for example, the moving distance of the measurement points measured by the laser tracker 50. In the present embodiment, it is preferable that the mutual distance between the fixed targets 40 is set to be longer than the moving distance of the transporting device until the series of operations from the movement of the stringer 10 to the attachment of the clip 22 is completed.

As described above, by setting the mutual distance between the fixed targets 40 as long as possible, it is possible to reduce the error of the position measurement by the laser tracker 50.

One of the three fixed targets 40 may be installed at a position close to all of the laser trackers 50.

For example, by detecting the positions of the three fixed targets 40 by each of the laser trackers 50, the coordinate system $(x_a, y_a, z_a)$ of the space where each of the laser trackers 50 is installed is defined. Hereinafter, this coordinate system is referred to as "measurer coordinate system A".

Then, the coordinate position of each laser tracker 50 in the measurer coordinate system $A(x_a, y_a, z_a)$ is obtained. Here, when defining the measurer coordinate system A, the position of the fixed target 40 installed at the position closest to all of the laser trackers 50 may be determined as the origin of the measurer coordinate system A. Accordingly, it possible to reduce an error in the coordinate position of the origin in each laser tracker 50. In other words, when installing the three fixed targets 40, one thereof may be installed at a position close to all of the laser trackers 50. Among the three fixed targets 40 shown in FIG. 4, it is preferable to use the fixed target 40-1 as the fixed target for determining the origin.

Once the measurer coordinate system A is determined in this manner, the position coordinates of each laser tracker 50 in the measurer coordinate system A can be specified. For example, the position coordinates of the laser tracker 50-1, the position coordinates of the laser tracker 50-2, and the position coordinates of the laser tracker 50-3 in the measurer coordinate system $A(x_a, y_a, z_a)$ are respectively defined as $A_1(x_{a1}, y_{a1}, z_{a1})$, $A_2(x_{a2}, y_{a2}, z_{a2})$, and $A_3(x_{a3}, y_{a3}, z_{a3})$.

Subsequently, the mutual positional relationship is calculated from the position coordinates of the laser trackers 50-1, 50-2, and 50-3. For example, one laser tracker of the plurality of laser trackers 50 is determined as a reference, and the position vector of another laser tracker (another position measurer) with respect to the laser tracker (one position measurer) determined as the reference is calculated. In other words, a difference vector between the position coordinates of the laser tracker 50 as the reference and the position coordinates of another laser tracker 50 is obtained. This position vector (difference vector) is used as a correction vector, which will be described later.

For example, in a case where the laser tracker 50-1 is determined as the reference, a position vector $A_1A_2^{-1}$ of the laser tracker 50-2 with respect to the laser tracker 50-1, and a position vector $A_1A_3^{-1}$ of the laser tracker 50-3 with respect to the laser tracker 50-1 are calculated.

Here, it is preferable that the laser tracker 50 as the reference is, for example, the laser tracker at a position closest to the coordinate definition target 14, which will be described later, and in FIG. 4, the laser tracker 50-1. Accordingly, it is possible to reduce an error included in the common spatial coordinate system used when the plurality of measurement points are measured by the plurality of laser trackers 50 in a shared manner.

Next, by detecting the position of the coordinate definition target 14 by the laser tracker 50 as the reference, a common coordinate system $(x_b, y_b, z_b)$ in which the supporting robot 4 to be measured is installed is defined. Hereinafter, this coordinate system $(x_b, y_b, z_b)$ is referred to as a "work coordinate system B" for distinguishment from the measurer coordinate system A.

For example, the three reflectors 14-1, 14-2, and 14-3 as the coordinate definition targets are installed in the flat plate portion 16 of the abutting plate 5. By measuring each of the reflectors 14-1, 14-2, and 14-3, which are the coordinate definition targets, by the laser tracker 50-1 as the reference, the work coordinate system $B(x_b, y_b, z_b)$ common to the configurations (the plurality of supporting robots 4, the abutting plates 5, and the like) installed on the transporting device 2 is defined.

The laser tracker 50-1 shares the work coordinate system B defined from the measurement positions of the coordinate definition targets 14 with the other laser trackers 50-2 and 50-3. For example, the laser tracker 50-1 transmits position coordinates $B_1(x_{b1}, y_{b1}, z_{b1})$ thereof (the laser tracker 50-1) in the work coordinate system B to the other laser trackers 50-2 and 50-3.

The other laser trackers 50-2 and 50-3 define the work coordinate system B to be used by themselves by using the correction vector obtained in advance and the work coordinate system B acquired from the laser tracker 50-1, and measure the measurement points 30 allocated to themselves using the defined work coordinate system B.

The laser tracker 50-1 may calculate a coordinate transformation matrix $W_1$ from the measurer coordinate system A to the work coordinate system B, and transmit information of the coordinate transformation matrix $W_1$ to the other laser trackers 50-1 and 50-3.

For example, the coordinate transformation matrix $W_1$ is represented by Expression (1).

$$W_1 = B_1 C \tag{1}$$

Here, C is a vector from the origin of the coordinate definition target 14 to the origin of the work coordinate system B, and is a known matrix.

The other laser trackers 50-2 and 50-3 respectively calculate transformation matrices $W_2$ and $W_3$ using the correction vectors obtained in advance and the coordinate transformation matrix $W_1$ of the laser tracker 50-1. The coordinate transformation matrix $W_2$ of the laser tracker 50-2 and the coordinate transformation matrix $W_3$ of the laser tracker 50-3 are respectively represented by Expressions (2) and (3).

$$W_2 = (A_1 A_2^{-1})^{-1} W_1 = (A_1 A_2^{-1})^{-1} B_1 C \tag{2}$$

$$W_3 = (A_1 A_3^{-1})^{-1} W_1 = (A_1 A_3^{-1})^{-1} B_1 C \tag{3}$$

The other laser trackers 50-2 and 50-3 obtain the measurement coordinates of each of the measurement points in the work coordinate system B by transforming the measurement coordinates of each of the measurement points measured by themselves using the coordinate transformation matrix $W_2$ and $W_3$.

The allocation of measurement points to each of the laser trackers 50 may be set in advance, or measurement thereof may be performed using the laser tracker that is presumed to be closest to each of the measurement points 30 based on the moving distance of the transporting device 2 and the relative positional relationship between the laser trackers 50.

Information on the position coordinates of each of the measurement points 30 measured using each of the laser trackers 50 in this manner is transmitted to the supporting robot control unit 32 (see FIG. 3). The supporting robot control unit 32 controls the position of the hand portion 8 of the supporting robot 4 based on the position information of each of the measurement points 30, that is, the position and inclination of the hand portion 8 of the supporting robot 4.

Figure 5:
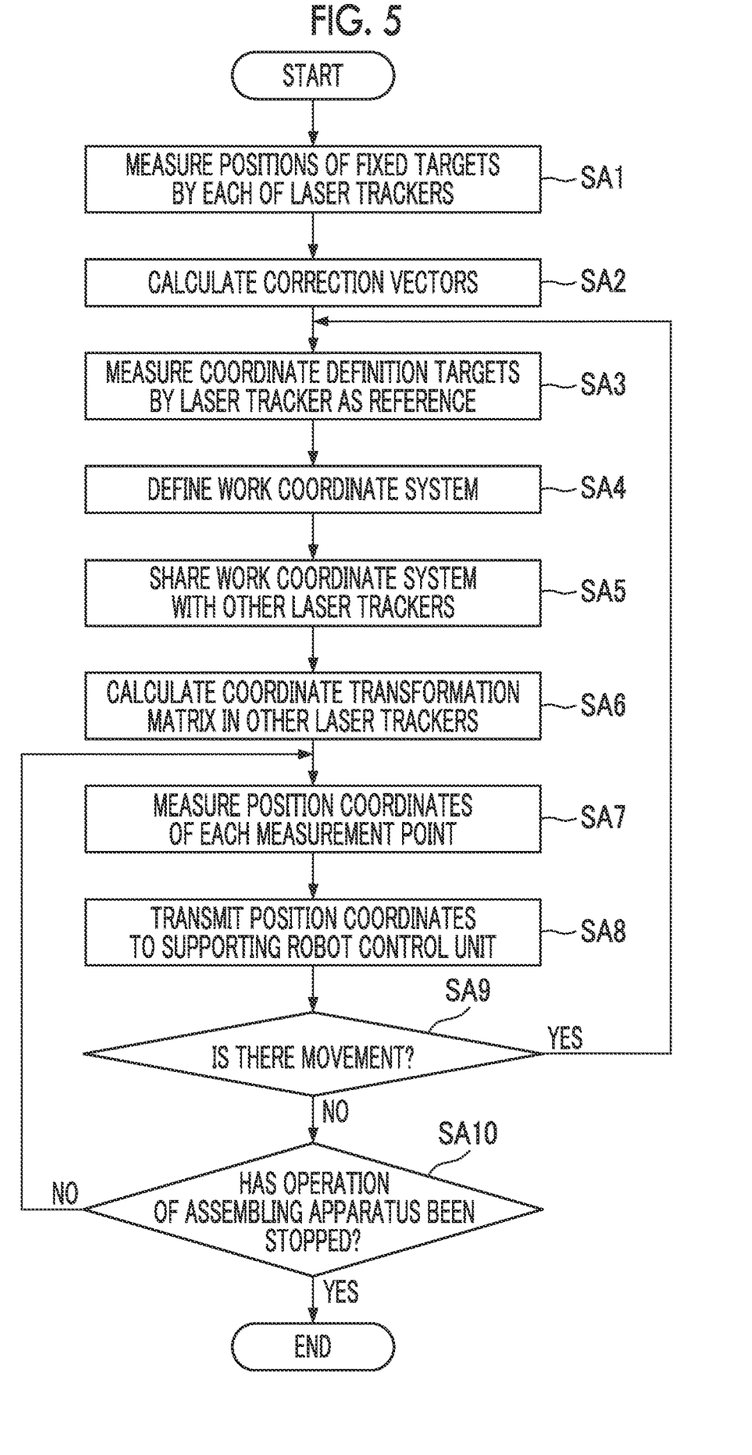
FIG. 5 is a flowchart showing a procedure of a position measurement method according to the embodiment of the present invention.

Next, the position measurement method by the position measurement system 100 according to the present embodiment will be described with reference to FIG. 5.

First, at the start of operation of the assembling apparatus 1, each of the laser trackers 50 measures the positions of the fixed targets 40-1, 40-2, and 40-3 (SA1). Accordingly, the position coordinates of the laser trackers 50-1, 50-2, and 50-3 in the measurer coordinate system A can be obtained.

Subsequently, any one of the laser trackers 50 (for example, laser tracker 50-1) is determined as the reference, and the position vectors of the other laser trackers (for example, the laser trackers 50-2 and 50-3) with respect to the laser tracker determined as the reference are calculated as correction vectors (SA2). The correction vectors are stored, for example, in a storage unit (not shown) included in each of the laser trackers 50.

Then, the positions of the coordinate definition targets 14 are detected by the laser tracker 50 as the reference (for example, the laser tracker 50-1 (SA3), and the position coordinates $B_1$ of the laser tracker 50-1 in the work coordinate system B are obtained (SA4).

The laser tracker 50-1 as the reference transmits the position coordinates $B_1$ to the other laser trackers 50-2 and 50-3. Accordingly, the position coordinates $B_1$ are shared by all of the laser trackers 50 (SA5).

When the other laser trackers 50-2 and 50-3 receive the position coordinates $B_1$, the other laser trackers 50-2 and 50-3 obtain their own position coordinates $B_2$ and $B_3$ in the work coordinate system B by using the correction vectors registered in advance. For example, a coordinate transformation matrix for transformation from the measurer coordinate system A to the work coordinate system B is obtained (SA6).

When the laser trackers 50 respectively obtain their coordinate transformation matrices as described above, the laser trackers 50 measure the measurement points 30 using the coordinate transformation matrices (SA7) and output the measurement result to the supporting robot control unit 32 (SA8).

Subsequently, it is determined whether or not the positions of the coordinate definition targets 14 have been moved due to the movement of the transporting device 2 (SA9). In a case where the positions of the coordinate definition targets 14 have not been moved (SA9: NO), it is determined whether or not the operation of the assembling apparatus 1 has been stopped (SA10). As a result, in a case where the operation has been stopped (SA10: YES), the process is ended.

On the other hand, in a case where the operation has not been stopped (SA10: NO), the process returns to step SA7 and the measurement of the measurement points 30 is repeated.

On the other hand, in step SA9, in a case where the positions of the coordinate definition targets 14 have been moved due to the movement of the transporting device 2, the process returns to step SA3, the positions of the coordinate definition targets 14 after the movement are measured again by the laser tracker 50-1 as the reference (SA3), and the work coordinate system B is updated (SA4). Then, the subsequent processing is performed using the updated work coordinate system B.

As described above, according to the position measurement system and the position measurement method according to the present embodiment, for example, since the information of the work coordinate system defined by the laser tracker (one position measurer) 50-1 is shared with the other laser trackers (the other position measurers) 50-2 and 50-3, and each of the laser trackers 50 measures the measurement points 30 of the supporting robot 4 allocated to itself based on the work coordinate system B, an error in the coordinate system used by each of the laser trackers 50 can be reduced compared to a case where each of the laser trackers 50 measures the positions of the coordinate definition targets 14 and individually defines the work coordinate system B. As a result, the accuracy of position measurement of the measurement points can be improved.

Furthermore, according to the present embodiment, since the mutual distance between the three fixed targets 40-1, 40-2, and 40-3 used by each of the laser trackers 50 to define the measurer coordinate system A can be set to be longer than that between the coordinate definition targets 14, it is possible to reduce an error (particularly, rotation angle) between the laser trackers included in the measurer coordinate system A defined by each of the laser trackers 50. Accordingly, the correction vectors can be obtained with relatively high accuracy, so that an error included in the common work coordinate system B defined based on the correction vectors can be reduced.

Furthermore, since the origin of the measurer coordinate system A is defined by using the fixed target 40 at a position closest to all of the laser trackers 50, an error in the origin in the measurer coordinate system A defined by each of the laser trackers 50 can be reduced. Accordingly, it is possible to further improve the accuracy of the correction vectors.

According to the present embodiment, since the information of the work coordinate system B defined by one laser tracker 50-1 is shared with the other laser trackers 50-2 and 50-3, even in a case where the work coordinate system B is moved relative to laser tracker 50-1, the work coordinate system B used by each of the laser trackers 50 can be obtained only by measuring the coordinate definition targets 14 with one laser tracker 50.

While the present invention has been described above using the embodiments, the technical scope of the present invention is not limited to the scope described in the above embodiments. Various modifications or improvements can be added to the above embodiments without departing from the gist of the invention, and the modified or improved forms are also included in the technical scope of the present invention. The above embodiments may be combined as appropriate.

The flow of the position measurement method described in the above embodiment is also an example, and unnecessary steps may be deleted, new steps may be added, or the procedure may be changed without departing from the gist of the present invention.

REFERENCE SIGNS LIST

1 Assembling apparatus
2 Transporting device
3 Table
4 Supporting robot
5 Abutting plate
6 Attaching robot
10 Stringer
11 Gripping robot
14 Coordinate definition target
14-1, 14-2, 14-3 Reflector
22 Clip
30 Measurement point
31 Transporting device control unit
32 Supporting robot control unit
33 Attaching robot control unit
34 Gripping robot control unit
35 Control device
40 (40-1, 40-2, 40-3) Fixed target
50 (50-1, 50-2, 50-3) Laser Tracker
100 Position measurement system

The invention claimed is:

1. A position measurement system comprising:
one position measurer configured to measure some of a plurality of measurement points;
another position measurer configured to measure the remaining measurement points; and
three fixed targets at a distance from each other,
wherein the one position measurer is further configured to
measure three coordinate definition targets for defining a coordinate system of the measurement points,
define the coordinate system from measurement results of the three coordinate definition targets,
measure the three fixed targets,
calculate, based on measurement results of the three fixed targets, a correction vector based on a positional relationship between the one position measurer and the other position measurer, and
measure the measurement points allocated to the one position measurer using the defined coordinate system, and
wherein the other position measurer is further configured to
measure the three fixed targets, and
measure the measurement points allocated to the other position measurer using the correction vector obtained in advance, and the coordinate system defined by the one position measurer.

2. The position measurement system according to claim 1, target mutual distances between the three fixed targets are set to be longer than target mutual distances between the coordinate definition targets used for defining the coordinate system of the measurement points.

3. The position measurement system according to claim 2, wherein, a coordinate origin is set using the fixed target of the three fixed targets which is at a position closest to all of the position measurers,
a coordinate system of the position measurers is defined by defining rotation in two orthogonal directions using the other two fixed targets, and
the correction vector is calculated using the coordinate system of the position measurers.

4. The position measurement system according to claim 1, wherein the coordinate system of the measurement points moves with respect to an installation position of the one position measurer.

5. The position measurement system according to claim 1, wherein a plurality of position measurers are provided as the other position measurer.

6. A robot control device that controls a robot using measurement results of the measurement points measured by the position measurement system according to claim 1.

7. A position measurement method of sharing measurement of a plurality of measurement points by a plurality of position measurers in a position measurement system including three fixed targets at a distance from each other, the method comprising:
measuring three coordinate definition targets for defining a coordinate system of the measurement points by one of the position measurers;
defining the coordinate system from measurement results of the three coordinate definition targets;
measuring, by each of the one position measurer and the other position measurer, the three fixed targets; and
calculating, by the one position measurer based on measurement results of the three fixed targets, a correction vector based on a positional relationship between the one position measurer and the other position measurer;
measuring, by the one position measurer, the measurement points allocated to the one position measurer using the defined coordinate system; and
measuring, by another position measurer, the measurement points allocated to the other position measurer, using the correction vector obtained in advance and the coordinate system defined by the one position measurer.

8. The position measurement method according to claim 7, further comprising
setting target mutual distances between the three fixed targets to be longer than target mutual distances between the coordinate definition targets used for defining the coordinate system of the measurement points.

* * * * *